(12) United States Patent
Komuravelli et al.

(10) Patent No.: US 11,443,013 B2
(45) Date of Patent: Sep. 13, 2022

(54) PIPELINED POINTWISE CONVOLUTION USING PER-CHANNEL CONVOLUTION OPERATIONS

(71) Applicant: Meta Platforms, Inc., Menlo Park, CA (US)

(72) Inventors: Rakesh Komuravelli, Fremont, CA (US); Krishnakumar Narayanan Nair, Newark, CA (US); Abdulkadir Utku Diril, Menlo Park, CA (US); Ehsan Khish Ardestani Zadeh, San Jose, CA (US); Yuchen Hao, Fremont, CA (US); Martin Schatz, Seattle, WA (US); Thomas Mark Ulrich, Mountain View, CA (US); Olivia Wu, Los Altos, CA (US); Anup Ramesh Kadkol, Sunnyvale, CA (US); Amin Firoozshahian, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 194 days.

(21) Appl. No.: 16/826,697

(22) Filed: Mar. 23, 2020

(65) Prior Publication Data

US 2021/0294875 A1    Sep. 23, 2021

(51) Int. Cl.
*G06F 17/15* (2006.01)
*G06F 17/16* (2006.01)
*G06N 3/08* (2006.01)

(52) U.S. Cl.
CPC ............ *G06F 17/153* (2013.01); *G06F 17/16* (2013.01); *G06N 3/08* (2013.01)

(58) Field of Classification Search
CPC .......... G06F 17/153; G06F 17/16; G06N 3/08
See application file for complete search history.

(56) References Cited

U.S. PATENT DOCUMENTS

| 2019/0102671 A1* | 4/2019 | Cohen .................... G06F 16/17 |
| 2020/0090030 A1 | 3/2020 | Huang et al. |

OTHER PUBLICATIONS

Extended European Search Report for European Application No. 21159437.9, dated Aug. 17, 2021, 8 Pages.

* cited by examiner

*Primary Examiner* — Michael D. Yaary
(74) *Attorney, Agent, or Firm* — Van Pelt, Yi & James LLP (57) ABSTRACT

A processor system comprises a hardware channel convolution processor unit and dot product processor unit. The channel convolution processor unit is configured to perform depthwise convolution, including by multiplying each data element of a first group of data elements of a convolution data matrix with a corresponding data element of a second group of data elements of a plurality of depthwise convolution weight matrices and summing together, for each specific channel, multiplication results corresponding to the specific channel to determine one corresponding result data element in a corresponding channel convolution result matrix to calculate a portion of depthwise convolution results. The dot product processor unit is configured to perform pointwise convolution, including applying pointwise weight matrices to the portion of depthwise convolution results to determine a portion of separable convolution results while at least another portion of the depthwise convolution results is being calculated by the processor system.

20 Claims, 7 Drawing Sheets

PIPELINED POINTWISE CONVOLUTION USING PER-CHANNEL CONVOLUTION OPERATIONS

BACKGROUND OF THE INVENTION

A whole class of complex artificial intelligence problems can be solved using neural networks. Since these problems are often computationally and data intensive, hardware solutions are often beneficial for improving the performance of neural networks. The solutions to artificial intelligence problems can often be more quickly solved using hardware-based solutions that optimize the performance of traditional 3D convolution operations. Traditional optimization approaches for depthwise convolution require specialized hardware and complex memory organization or transformation schemes. It is a technical challenge to create a hardware platform compatible with solving traditional 3D convolution operations while also significantly improving the performance and efficiency. Therefore, there exists a need for a hardware and data path solution that improves on the ability to efficiently compute convolution operations needed for solving complex artificial intelligence problems without introducing significant complexity and restrictions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for performing efficient 3D convolution operations is disclosed. Using the disclosed techniques, the workload of 3D convolutions is decomposed into separable convolutions and distributed in a pipeline manner across a hardware channel convolution processor unit and a hardware dot product processor unit. For example, a 3D convolution operation is decomposed into separate depthwise and pointwise convolution operations. A hardware channel convolution processor unit performs the depthwise convolution operations. The output activations from the depthwise convolutions are used as input for a hardware dot product processor unit to perform the pointwise convolution operations. The layout format of the output activations from depthwise convolution are compatible with the hardware dot product processor unit and do not require resource and time intensive layout transformations. In some embodiments, a group of processing elements each includes a hardware channel convolution processor unit and a hardware dot product processor unit. The processing elements are configured to pipeline respective depthwise and pointwise convolution operations. For example, the output activations of a processing element's hardware channel convolution processor unit can be transmitted as input to a different processing element's hardware dot product processor unit. The output activations may be transmitted using a reduction or peer-to-peer network connection. In some embodiments, the hardware channel convolution processor unit and the hardware dot product processor unit of a single processing element work together. In various embodiments, while a hardware dot product processor unit is processing the output activations of a hardware channel convolution processor unit, the same hardware channel convolution processor unit can be processing additional output activations. By pipelining the depthwise and pointwise convolution operations and distributing them to different processor units, the utilization of the processor units of processing elements are significantly increased. Due in part to the higher utilization rate, 3D convolutions can be performed with significant performance benefits over a traditional general purpose processor and/or standard matrix processor hardware. The specialized hardware configuration of the processing units disclosed herein results in significant performance improvements and resource efficiencies gained over using a general purpose processor and traditional hardware configurations.

In some embodiments, the depthwise convolutions are performed using a channel convolution engine. A channel convolution engine includes a channel convolution processor unit capable of performing convolution operations using two input matrices by applying different weight matrices to different channels of portions of a data convolution matrix. The arguments for the channel convolution processor unit may be prepared by a data input unit and a channel weight input unit. For example, a data input unit prepares portions of the data convolution matrix and a channel weight input unit prepares the corresponding weight matrices. In some embodiments, the channel convolution processor unit includes a plurality of calculation units such as vector units used to process input vectors of the input matrices. In various embodiments, a calculation unit includes at least a vector multiply unit and a vector adder unit. The vector multiply unit is capable of performing multiply operations using corresponding elements of two input vectors, data elements from the same channel and weight input elements from a weight matrix. In some embodiments, the vector adder unit is used to sum the vector of multiplication results computed using a vector multiply unit. For example, the vector adder unit can be used to compute the dot product result of two vectors using the vector multiplication results of vector elements from corresponding input vectors. In some embodiments, the vector adder unit is an adder tree. For example, an adder tree computes the sum of the multiplication results by summing multiplication results and subsequent partial sums in parallel.

In some embodiments, a data input unit and a channel weight input unit of a channel convolution engine prepare matrix arguments as vector operands for the channel convolution processor unit. The data input unit loads a portion of a data convolution matrix such as a 3×3×32 portion of a larger three-dimensional (height×width×channel) matrix. For example, for each vector register of the data input unit, a portion of the data convolution matrix is loaded corresponding to different channels. The number of vector registers to load can correspond to the number of elements in a weight matrix. For example, using a plurality of 3×3 weight matrices, the data input unit prepares nine vector registers, each holding data elements corresponding to multiple channels, such as 32 or another appropriate number of channels. In some embodiments, the number of channels loaded is based on a cache line size and can match the vector register size. The corresponding elements at each similar depth of each vector register are elements of a sub-matrix of the data convolution matrix for a single channel.

In some embodiments, a channel weight input unit prepares a number of weight matrices for the channel convolution processor unit. The number of weight matrices prepared corresponds to the number of channels loaded for each vector register of the data input unit. For example, 32 weight matrices may be loaded using nine vector registers of the channel weight input unit to correspond to loading a 3×3×32 portion of a data convolution matrix. Once the vector registers of the data input unit and channel weight input unit are loaded with activation and weight data, the corresponding elements of the vector registers are loaded into vector units of a channel convolution processor unit. The data input elements of the same channel and a corresponding weight matrix are loaded to the same vector unit. Each vector unit calculates a dot product result by multiplying corresponding data input and weight input elements and summing together the multiplication results to determine one channel convolution result data element. The channel convolution result data elements of each vector unit are combined to determine a corresponding portion of a channel convolution result matrix, such as a 1×1×32 portion of a channel convolution result matrix for each 3×3×32 portion of the data convolution matrix. In various embodiments, the channel convolution result data elements are output activations that are used to perform pointwise convolution by a dot product engine.

In various embodiments, once corresponding convolution results for a portion of the data convolution matrix are determined, the output activations are transmitted to perform pipelined pointwise convolutions and the next portion of the data convolution matrix is processed by the channel convolution engine to determine additional output activations. For example, an additional vertical (or horizontal) slice of the data convolution matrix is loaded by the data input unit and used with a portion of the data from the previous portion of the data convolution matrix. In various embodiments, successive iterations can reuse portions of the data convolution matrix used from the previous iteration and need only a new slice of additional data elements. For example, the next 3×3×32 portion of a data convolution matrix only requires loading a 1×3×32 slice of the data convolution matrix corresponding to a vertical slice to combine with a 2×3×32 portion from the previous iteration. Similarly, a 3×1×32 slice of the data convolution matrix corresponding to a horizontal slice can be combined with a 3×2×32 portion from a previous iteration. The data elements from the previous iteration that overlap with the data elements from the current iteration are reused to minimize reloading of duplicative data. In various embodiments, the channel weight input data is reused across iterations resulting in significant performance efficiency.

In some embodiments, a dot product engine performs pointwise convolutions on the output activations determined by a channel convolution engine. The dot product engine can include a matrix processor unit configured to compute, in parallel, at least the partial result of multiple convolution operations such as multiple pointwise depthwise convolutions. Each pointwise convolution operation can involve two input operands, a set of pointwise weights and a vector of output activations from a channel convolution engine. In some embodiments, the matrix processor unit includes a plurality of calculation units such as vector units used to process input vectors for pointwise convolution. In various embodiments, a calculation unit includes at least a vector multiply unit and a vector adder unit. The vector multiply unit is capable of performing multiply operations using corresponding elements of two input vectors, data elements from the output activations of a channel convolution engine and data elements from a set of pointwise weights. In some embodiments, the vector adder unit is used to sum the vector of multiplication results computed using a vector multiply unit to determine a pointwise convolution element result. For example, a matrix processor unit may include 32 calculation units, each calculation unit a vector unit to operate on a different set of pointwise weights prepared by a pointwise weight input unit. A data input unit of the dot product engine can broadcast the same output activations vector to each vector unit. This allows the dot product engine to process the output activation results determined by the channel convolution engine with all relevant pointwise weights. In some embodiments, the vector adder unit is an adder tree. For example, an adder tree computes the sum of the multiplication results by summing multiplication results and subsequent partial sums in parallel.

In some embodiments, the separate depthwise and pointwise convolutions of a 3D convolution can be distributed across multiple processing elements, with each processing element having its own processing components. Portions for the activation data can be assigned to the channel convolution engine of different processing elements to each perform a portion of the depthwise convolution operation. The applicable channel weights can be broadcasted to all applicable processing elements and their respective channel convolution engines. The depthwise convolution results of the different processing elements can be processed by different dot product engines to determine portions of the 3D convolution result matrix in parallel. In various embodiments, the layout of the activation input data matrix, channel weights, pointwise weights, and 3D convolution result matrix use a channel-first layout format that increases memory and processing efficiency. For example, input arguments and output arguments for the convolution processor unit and dot product processor unit are in the same format as stored in memory and do not require complex processor and memory bandwidth intensive operations such as layout transformation operations. Utilizing the disclosed hardware configuration for pipelined depthwise and pointwise operations results in significant performance and efficiency improvements.

In some embodiments, a processor system comprises a hardware channel convolution processor unit and a hardware dot product processor unit. For example, a processing element of a processor system includes a hardware channel convolution engine and a hardware dot product engine. The hardware channel convolution engine includes a hardware channel convolution processor unit capable of performing depthwise convolutions on a portion of a convolution (or activation) data matrix. The hardware dot product engine includes a hardware dot product processor unit capable of performing dot product operations using a group of pointwise weights. In some embodiments, the hardware dot product processor unit is a matrix processor unit. The hardware channel convolution processor unit is configured to perform a portion of a depthwise convolution. For example, the convolution data matrix of a depthwise convolution is subdivided into portions of the convolution data matrix that can be performed separately, such as sequentially and/or in parallel. For each portion, the hardware channel convolution processor unit is configured to multiply each data element of a first group of data elements of a plurality of channels of a portion of a convolution data matrix with a corresponding data element of a second group of data elements of a plurality of depthwise convolution weight matrices to determine a corresponding multiplication result of multiplication results. For example, the first group of data elements includes a three-dimensional sub-matrix portion of the convolution data matrix with data elements from multiple different channels. The second group of data elements includes multiple weight matrices associated with the different channels. The multiplication results are determined based on channel.

In some embodiments, for each specific channel of the plurality of channels, the hardware channel convolution processor unit is configured to sum together ones of the multiplication results corresponding to the specific channel to determine one corresponding channel convolution result data element in a corresponding channel convolution result matrix to calculate a portion of depthwise convolution results. For example, the multiplication results corresponding to a specific channel are summed together. This can be performed concurrently for multiple channels by the hardware channel convolution processor unit to determine multiple corresponding channel convolution result data elements. The result is a vector of channel convolution result data elements that are also depthwise convolution results. The vector of depthwise convolution results can be fed in a pipeline manner to a dot product engine that includes a hardware dot product processor unit configured to perform pointwise convolution.

In some embodiments, the hardware dot product processor unit is configured to perform at least a portion of a pointwise convolution, including by being configured to apply pointwise weight matrices to the portion of depthwise convolution results calculated using the hardware channel convolution processor unit to determine a portion of separable convolution results while at least another portion of the depthwise convolution results is being calculated by the processor system. For example, a hardware dot product processor unit can apply a vector of pointwise weights to a vector of channel convolution result data elements to determine a portion of separable convolution results. In some embodiments, the hardware dot product processor unit can apply multiple vectors of pointwise weights to the same vector of channel convolution result data elements to determine multiple pointwise convolution element results concurrently.

In some embodiments, as the hardware dot product processor unit calculates a portion of separable convolution results, the processor system concurrently calculates another portion of the depthwise convolution results. For example, a hardware channel convolution processor unit determines a portion of depthwise convolution results for a second portion of the convolution data matrix while a hardware dot product processor unit operates on the channel convolution result data elements determined using a first portion of the convolution data matrix. By utilizing both the hardware channel convolution processor unit and the hardware dot product processor unit concurrently to perform different portions of a 3D convolution operation, significant performance and efficiency advantages are gained. Moreover, in some embodiments, the data layout of the results determined using the hardware channel convolution processor unit is compatible with the inputs to the hardware dot product processor unit and allows the processor system to avoid performing costly and complex memory layout transformation operations.

In some embodiments, the processor system includes multiple processor elements that work together on a 3D convolution operation. The pipelined hardware channel convolution processor unit and the hardware dot product processor unit may be part of the same processing element. In some embodiments, the pipelined hardware channel convolution processor unit and the hardware dot product processor unit are part of different processing elements. For example, the hardware channel convolution processor unit of a first processing element provides partial depthwise convolution results to the hardware dot product processor unit of a second processing element. The partial depthwise convolution results can be transmitted via a direct connection such as a peer-to-peer connection or a reduction network. The use of a direct connection significantly improves network efficiency and results in improved performance over traditional techniques.

Figure 1:
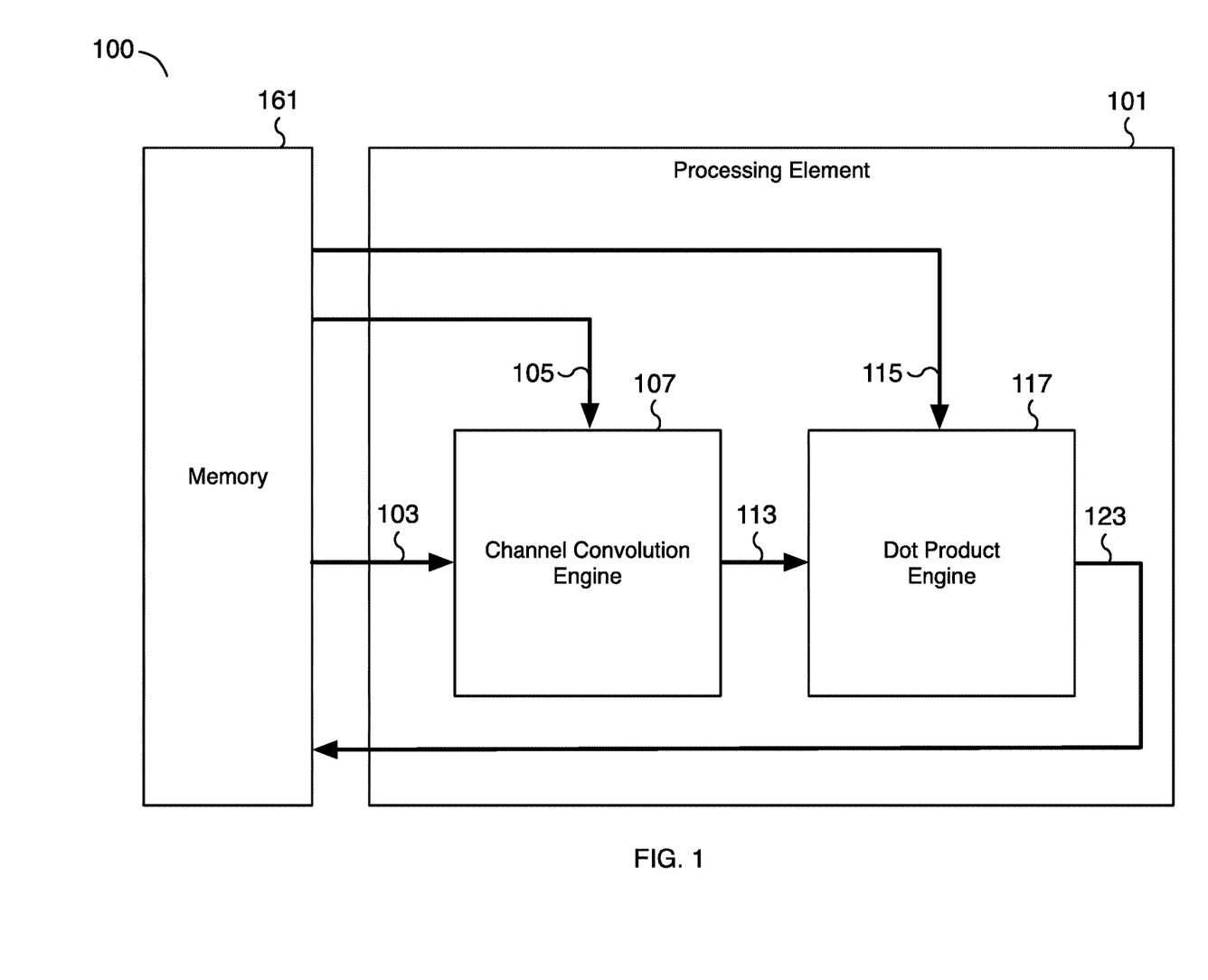
FIG. 1 is a block diagram illustrating an embodiment of a system for solving artificial intelligence problems using a neural network.

FIG. 1 is a block diagram illustrating an embodiment of a system for solving artificial intelligence problems using a neural network. In the example shown, system 100 includes processing element 101 and memory 161. Processing element 101 includes channel convolution engine 107 and dot product engine 117. In some embodiments, processing element 101 is a hardware integrated circuit, for example, an application specific integrated circuit (ASIC) and includes specialized hardware components channel convolution engine 107 and dot product engine 117. As compared to a general purpose processor, processing element 101 is designed and implemented using a specialized hardware integrated circuit configured to more efficiently perform one or more specific computing tasks related to performing convolution operations and/or solving artificial intelligence problems using a neural network. The specialized hardware results in significant performance improvements and resource efficiencies gained over using a general purpose processor.

In the example shown, channel convolution engine 107 and dot product engine 117 can each receive data from memory 161 via connection 105 and 115, respectively. Channel convolution engine 107 and dot product engine 117 can each also receive data via connection 103 and 113, respectively. The output of channel convolution engine 107 can be sent as input to dot product engine 117 via connection 113. In some embodiments, channel convolution engine 107 transmits output to another location (not shown) such as memory 161, another processing element (not shown), local storage (not shown), or another appropriate storage location. For example, in some embodiments, channel convolution engine 107 can transmit output activations to a downstream processing element such as to the dot product engine of another processing element. In some embodiments, the connection is a direct connection such as via a peer-to-peer connection or a reduction network. The direct connection significantly improves the transmission performance between processing elements and their components, for example, by bypassing a communication bus and required bus signaling.

In some embodiments, dot product engine 117 outputs results via connection 123 to memory 161. In various embodiments, dot product engine 117 can also output to another location (not shown) such as another processing element (not shown), local storage (not shown), or another appropriate storage location. In various embodiments, dot product engine 117 outputs results to memory 161 where the results of a 3D convolution operation are merged. For example, the partial results of multiple dot product engines of different processing elements can be merged at memory 161.

In the example shown, channel convolution engine 107 and dot product engine 117 can operate concurrently. For example, channel convolution engine 107 can perform depthwise convolution operations while dot product engine 117 performs pointwise convolution operations. In some embodiments, channel convolution engine 107 utilizes as input a portion of an activation data matrix received from memory 161 and corresponding channel weights also received from memory 161. Once a vector of output activations is determined, for example, by channel convolution engine 107 or another appropriate channel convolution engine, dot product engine 117 performs pointwise convolution operations using the determined output activations along with pointwise weights received from memory 161. As dot product engine 117 is processing output activations, channel convolution engine 107 concurrently performs depthwise convolution on a second portion of the activation data matrix to produce additional output activations. In some embodiments, channel convolution engine 107 feeds a downstream dot product engine of a different processing element instead of the dot product engine 117.

In various embodiments, the arrows of FIG. 1 represent the direction data moves through the components of system 100. For example, the arrows may correspond to multi-element wide communication/data buses and/or data lines. In some embodiments, one or more of the connections of FIG. 1 may utilize a communication bus (not shown).

Figure 2:
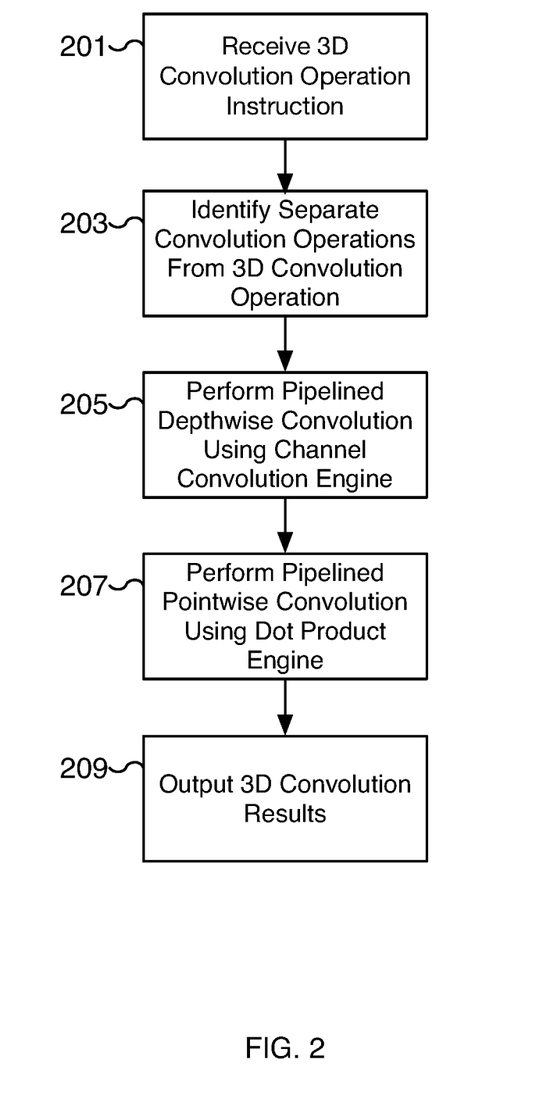
FIG. 2 is a flow chart illustrating an embodiment of a pipelined process for performing a three-dimensional convolution operation using a processor system.

FIG. 2 is a flow chart illustrating an embodiment of a pipelined process for performing a three-dimensional convolution operation using a processor system. For example, a 3D convolution operation instruction is received. The 3D convolution operation is decomposed into separable convolutions including depthwise and pointwise convolution operations. One or more processing elements are each configured with a hardware channel convolution processor unit and a hardware dot product processor unit. For each pair of hardware channel convolution and dot product processor units, the hardware channel convolution processor unit performs depthwise convolutions and the hardware dot product processor unit performs pointwise convolutions using the output activations determined by the channel convolution processor unit. In some embodiments, the 3D convolution operation is performed by distributing processing across multiple processing elements and one or more hardware channel convolution processor units and hardware dot product processor units are utilized. In some embodiments, each processing element is a processing element such as processing element 101 of FIG. 1. In various embodiments, the process of FIG. 2 is performed at least in part by using the system of FIG. 1. For example, in some embodiments, the 3D convolution operation instruction is processed by a compiler into separable convolution instructions with corresponding hardware operation instructions directed to one or more processing elements.

At 201, a 3D convolution operation instruction is received. For example, a 3D convolution operation instruction is received that specifies a convolution data matrix and corresponding weights. In various embodiments, the convolution data matrix and corresponding weights may be specified by a memory address location or another resource identifier. In some embodiments, the instruction is received at a processing element that includes a hardware channel convolution processor unit and hardware dot product processor unit.

At 203, separate convolution operations are identified from a 3D convolution operation. For example, depthwise convolutions and pointwise convolutions are identified from the 3D convolution operation received at 201. The 3D convolution is decomposed into separable convolutions and corresponding arguments. For example, a portion of an activation data matrix is identified, channel weights are identified, and pointwise weights are identified. In some embodiments, an activation input matrix and channel weights are prepared for a channel convolution processor unit and pointwise weights are prepared for a dot product processor unit. The channel weights and pointwise weights may correspond to the same or different processing elements and their respective processor units.

At 205, pipelined depthwise convolution is performed using a channel convolution engine. For example, an activation input matrix and channel weights are received at a channel convolution engine that includes a channel convolution processor unit. The activation data is prepared by channel into two-dimensional matrices and corresponding channel weights are prepared into corresponding two-dimensional weight matrices. The channel convolution processor unit performs a depthwise convolution on the input arguments to determine channel convolution result data elements in a corresponding channel convolution result matrix. The channel convolution result data elements are a portion of a depthwise convolution result and are output activations calculated by the channel convolution engine.

The output activations are fed to a dot product engine to perform pointwise convolution operations.

In the process of FIG. 2, the steps of 205 and 207 are part of a pipelined process. The channel convolution engine and corresponding channel convolution processor unit continue to calculate output activations on different portions of the activation input matrix for the dot product engine to process. As the channel convolution engine processes the next set of output activations for the dot product engine at 205, the dot product engine processes that last calculated set of output activations at 207. After the initial set of output activations, both the channel convolution engine and the dot product engine operate concurrently. In some embodiments, one of the engines may wait for the other to complete as one of the steps of 205 or 207 may take longer than the other.

At 207, pipelined pointwise convolution is performed using a dot product engine. For example, output activations from a channel convolution engine are utilized as one input to a dot product engine. The dot product engine also prepares multiple sets of pointwise weights. A matrix processor unit of the dot product engine performs pointwise convolution using the output activations of the channel convolution engine and the prepared pointwise weights as arguments. The resulting output is a portion of separable convolution results corresponding to the 3D convolution operation received at 201.

At 209, 3D convolution results are outputted. For example, partial convolution results corresponding to different portions of a convolution matrix are outputted to a memory such as a shared memory. In some embodiments, the memory is memory 161 of FIG. 1. In some embodiments, the 3D convolution results are outputted to a different storage location such as a scratchpad memory location or another appropriate location.

Figure 3:
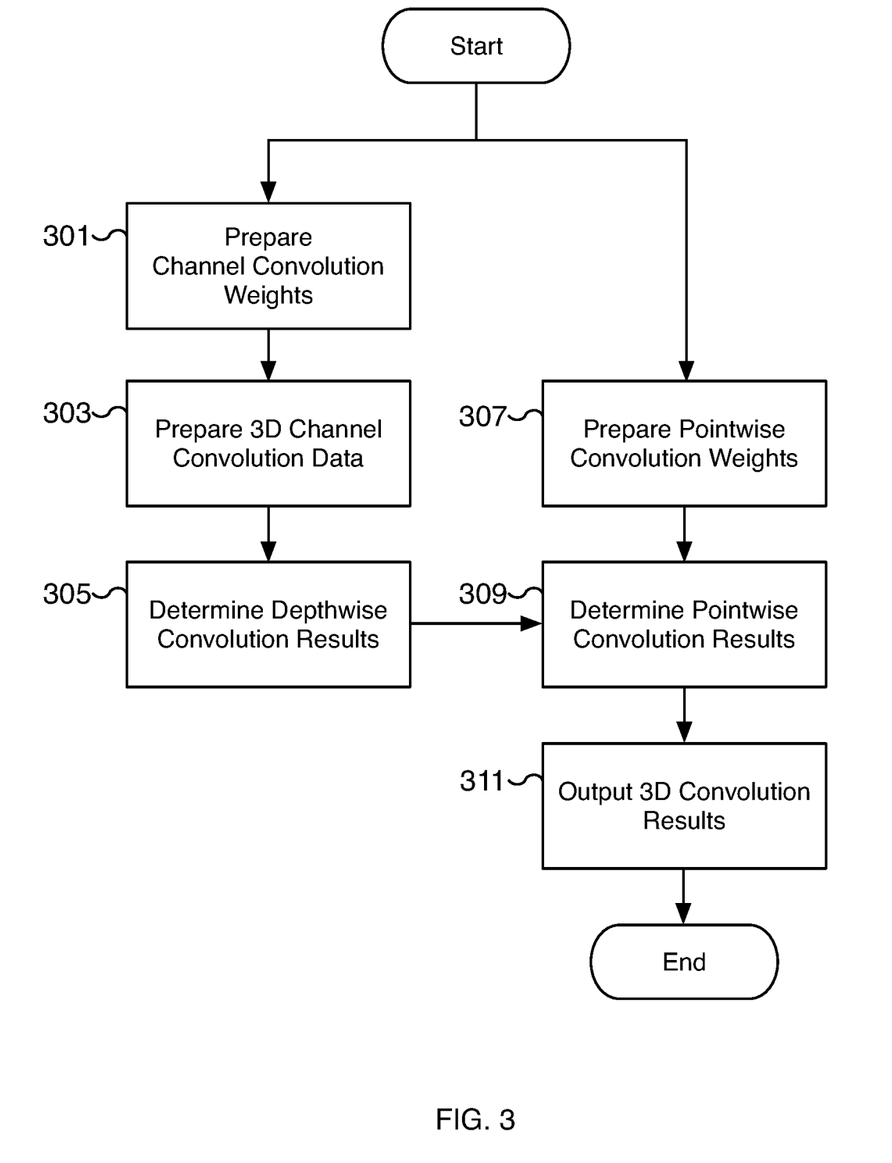
FIG. 3 is a flow chart illustrating an embodiment of a pipelined process for performing a three-dimensional convolution operation using a processor system.

FIG. 3 is a flow chart illustrating an embodiment of a pipelined process for performing a three-dimensional convolution operation using a processor system. In the example shown, different portions of the process of FIG. 3 are performed on a channel convolution engine and on a dot product engine. For example, at least portions of the steps 301, 303, and 305 are performed by a channel convolution engine such as channel convolution engine 107 of FIG. 1 and at least portions of the steps 307, 309, and 311 are performed by a dot product engine such as dot product engine 117 of FIG. 1. In some embodiments, the process of FIG. 3 is performed as part of the process of FIG. 2. In some embodiments, the steps 301, 303, and 305 are performed at 203 and/or 205 of FIG. 2, the steps 307 and 309 are performed at 203 and/or 207 of FIG. 2, and/or the step 311 is performed at 209 of FIG. 2.

At 301, channel convolution weights are prepared. For example, channel convolution weight matrices associated with 3D channel convolution data are prepared. In some embodiments, the channel weight matrices are converted from two-dimensional weight matrices to linearized weight input vectors for a channel convolution processor unit. The prepared channel convolution weights are provided to a channel convolution processor unit. In some embodiments, each vector unit of a channel convolution processor unit receives a different corresponding channel weight matrix. In some embodiments, the channel convolution weights are prepared by a channel weight input unit such as channel weight input unit 405 of FIG. 4.

At 303, 3D channel convolution data is prepared. For example, a portion of a convolution matrix assigned to the channel convolution engine is prepared as input to the channel convolution processor unit. In various embodiments, the prepared convolution data includes two-dimensional activation data matrices each associated with a different corresponding channel weight matrix. In some embodiments, the 3D channel convolution data is prepared as linearized channel data input vectors for a channel convolution processor unit. The prepared channel convolution data is provided to a channel convolution processor unit. In some embodiments, each vector unit of a channel convolution processor unit receives a different data input vector corresponding to a data matrix of a different channel. In some embodiments, the 3D channel convolution data is prepared by a data input unit such as data input unit 403 of FIG. 4.

At 305, depthwise convolution results are determined. For example, a channel convolution processor unit performs depthwise convolution using the channel convolution weights prepared at 301 and the corresponding channel convolution data prepared at 303. In some embodiments, the channel convolution processor unit includes a group of calculation or vector units. Each vector unit can perform a portion of a depthwise convolution operation using the provided vector inputs. In various embodiments, the output of the channel convolution processor unit is transmitted to and utilized as an input for step 309.

In some embodiments, step 305 continues as additional 3D channel convolution data exists and remains to be processed into depthwise convolution results. As each new portion of channel convolution data is processed, the corresponding output activations are transmitted to step 309. In some embodiments, the channel convolution processor unit is channel convolution processor unit 407 of FIG. 4.

At 307, pointwise convolution weights are prepared. For example, pointwise convolution weights associated with the depthwise output are prepared. In some embodiments, the pointwise weights are a set of 1×1 weight vectors, where each weight vector includes multiple 1×1 weight elements. The prepared pointwise weights are provided to a matrix processor unit of a dot product engine. In some embodiments, each vector unit of a matrix processor unit receives a different pointwise weight vector of the set of 1×1 weight vectors. In some embodiments, the pointwise weights are prepared by a pointwise weight input unit such as pointwise weight input unit 605 of FIG. 6.

At 309, pointwise convolution results are determined. For example, depthwise convolution results are received from step 305 and used as input for pointwise convolution operations. In some embodiments, the depthwise convolution results are received at a data input unit of a dot product engine and prepared for a matrix processor unit. For example, a vector of depthwise convolution results can be broadcasted to multiple vector units of a matrix processor unit. The matrix processor unit performs pointwise convolution using the received depthwise convolution results and the corresponding pointwise convolution weights prepared at 307. In some embodiments, the matrix processor unit includes a group of calculation or vector units and each vector unit can calculate different result elements of a convolution result matrix. In various embodiments, the output of the channel convolution processor unit is transmitted to step 311. In some embodiments, the depthwise convolution results are prepared for the matrix processor unit using a data input unit such as data input unit 603 of FIG. 3. In some embodiments, the matrix processor unit is matrix processor unit 607 of FIG. 6.

At 311, 3D convolution results are outputted. For example, the pointwise convolution results determined at 309 are separable convolution results. The results correspond to different portions of a convolution matrix and are outputted at step 311 as 3D convolution results. In some embodiments, the results are outputted to a memory such as a shared memory. In some embodiments, the memory is memory 161 of FIG. 1. In some embodiments, the 3D convolution results are outputted to a different storage location such as a scratchpad memory location or another appropriate location.

Figure 4:
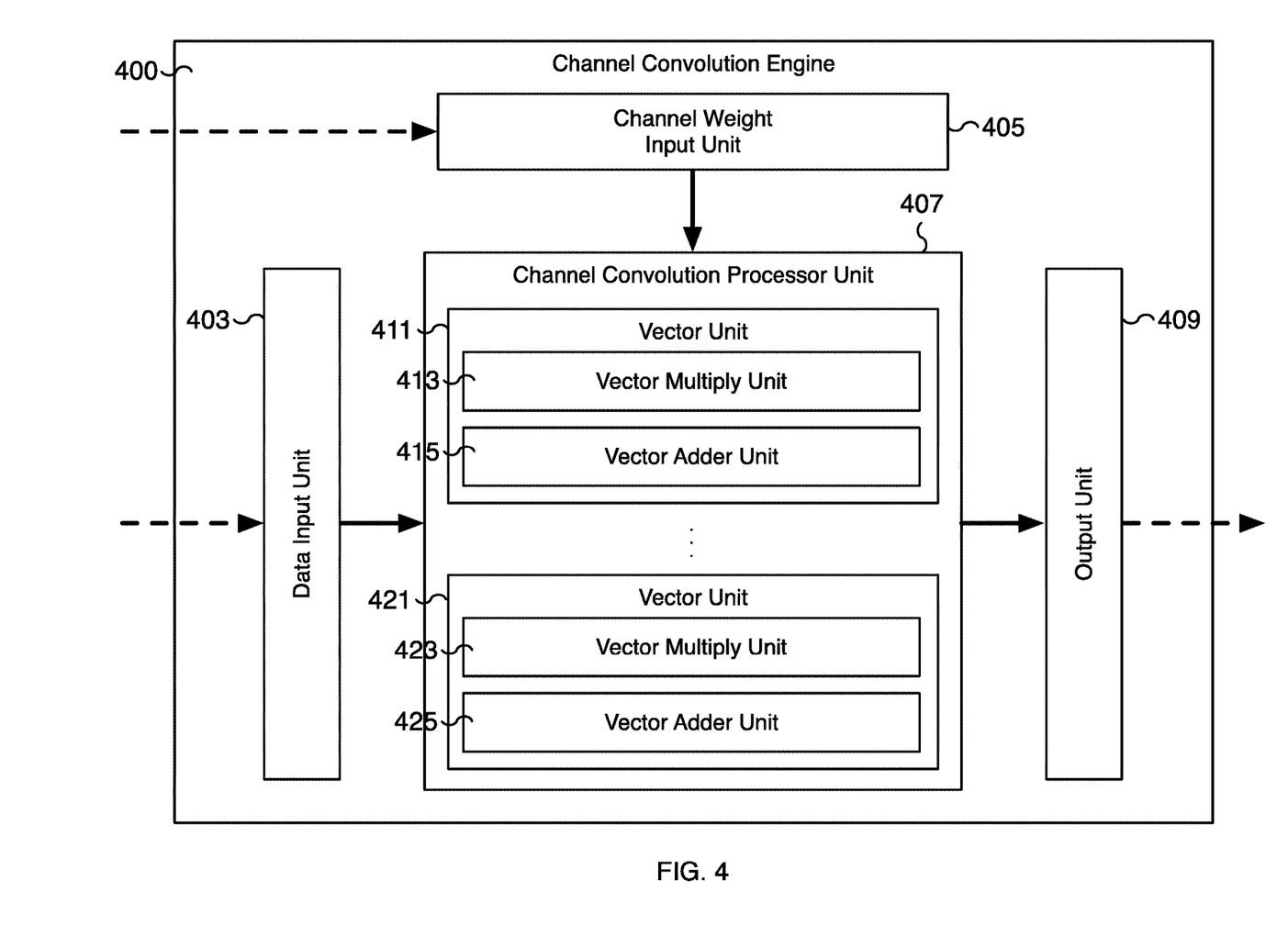
FIG. 4 is a block diagram illustrating an embodiment of a channel convolution engine for solving artificial intelligence problems using a neural network.

FIG. 4 is a block diagram illustrating an embodiment of a channel convolution engine for solving artificial intelligence problems using a neural network. In the example shown, channel convolution engine 400 includes data input unit 403, channel weight input unit 405, channel convolution processor unit 407, and output unit 409. In some embodiments, channel convolution engine 400 is a hardware integrated circuit, for example, an application specific integrated circuit (ASIC) and includes hardware components data input unit 403, channel weight input unit 405, channel convolution processor unit 407, and output unit 409. As compared to a general purpose processor, channel convolution engine 400 is designed and implemented using a specialized hardware integrated circuit to more efficiently perform one or more specific computing tasks related to performing convolution operations and/or solving artificial intelligence problems using a neural network. The specialized hardware results in significant performance improvements and resource efficiencies gained over using a general purpose processor. In some embodiments, channel convolution engine 400 is channel convolution engine 107 of FIG. 1.

In the example shown, channel convolution processor unit 407 includes multiple vector calculation units including at least vector units 411 and 421. In various embodiments, channel convolution processor unit 407 receives data input vectors (not shown) from data input unit 403 and channel weight input vectors (not shown) from channel weight input unit 405. For example, in some embodiments, data input vectors are generated by data input unit 403 that correspond to 2D sub-matrices of a 3D activation data input matrix, where each 2D sub-matrix corresponds to a different channel of the 3D activation data input matrix. Channel weight input vectors are generated by channel weight input unit 405 and correspond to different weight matrices. In various embodiments, the 2D sub-matrices of the 3D activation data input matrix and the channel weight matrices may be 3×3 matrices or another appropriate size. The data elements of the activation data input matrix and the weight input matrices may be stored and retrieved from memory, such as memory 161 of FIG. 1.

In some embodiments, each generated data input vector and channel weight input vector pair may be passed as arguments to a vector calculation unit, such as one of vector units 411 and 421, of channel convolution processor unit 407. For example, a vector unit of channel convolution processor unit 407 may determine a channel convolution result data element, such as a dot product result, using a data input vector and channel weight input vector pair. In some embodiments, channel convolution processor unit 407 includes 32 vector units and/or another appropriate number of vector units. The number of vector units may be based on the cache line size, for example, the cache line size or a multiple of the cache line size. For example, the cache line multiple can be one and the number of vector units may be equal to the cache line size. Each vector unit may take data elements corresponding to two vectors as arguments and can each produce a single element result. Using 3×3 matrices as an example, each vector unit takes two 9-element vectors as arguments, one vector corresponding to a sub-matrix of the activation data input matrix and one vector corresponding to a weight matrix. Taken across all vector units of channel convolution processor unit 407, the results are an output vector result and correspond to data elements of a channel convolution result matrix. Over additional iterations, different portions of the activation data input matrix are processed using the same weight matrices by channel convolution processor unit 407 to determine additional data elements of the channel convolution result matrix. In various embodiments, the output of channel convolution processor unit 407 for each iteration can be an output vector and is received at output unit 409. In some embodiments, the output vector received at output unit 409 is a 32-element vector. Although 32 channels are processed using 3×3 matrices for each iteration in the example above, the size of the elements and matrices processed by channel convolution engine 400 can be configured as appropriate. For example, elements may be 4-bits, 8-bits, 2-byte, 4-bytes, or another appropriate size. Similarly, the sub-matrices of the activation data input matrix and channel weight matrices can be 3×3, 5×5, or another appropriate size. In some embodiments, the results calculated by channel convolution processor unit 407 are depthwise convolution results corresponding to a 3D convolution operation decomposed into a combination of separable convolutions.

In some embodiments, channel convolution processor unit 407 is configured to receive multiple pairs of input matrices. Each pair of input matrices includes a data input matrix and a corresponding channel weight matrix. Each data input matrix corresponds to a particular channel of a portion of an activation data input matrix and is processed by data input unit 403. Each weight input matrix corresponds to the weight matrix to be applied to the channel and is processed by channel weight input unit 405. Data input unit 403, channel weight input unit 405, and output unit 409 may be implemented using hardware registers, such as flip-flop circuits, for transferring multiple input and output elements to/from channel convolution processor unit 407. In some embodiments, elements corresponding to each data input vector are retrieved from memory, such as memory 161 of FIG. 1, and loaded into a corresponding vector unit, such as vector units 411 or 421, of channel convolution processor unit 407 via data input unit 403. For example, a channel convolution processor unit with 32 vector units can be loaded with 32 vectors of data input elements corresponding to 32 different channels of an activation data input matrix via data input unit 403. Similarly, elements corresponding to each weight input vector are retrieved from memory, such as memory 161 of FIG. 1, and loaded into a corresponding vector unit, such as vector units 411 or 421, of channel convolution processor unit 407 via channel weight input unit 405. For example, a channel convolution processor unit with 32 vector units can be loaded with 32 vectors of channel weight input elements corresponding to 32 different channel weight matrices via channel weight input unit 405. As results corresponding to portions of the activation data input matrix are determined, additional data elements are loaded for processing additional portions of the activation data input matrix with the same weight matrices. For example, data input unit 403 loads additional needed data elements and generates new data input vectors corresponding to the new portion of the activation data input matrix for determining additional channel convolution results. As the data input vectors change to correspond to new portions of the activation data input matrix, the weight input vectors can remain the same and can be reused, significantly improving the efficiency of convolution operations. In various embodiments, the arrows of FIG. 4 represent the direction data moves through the components of channel convolution engine 400. For example, the arrows may correspond to multi-element wide communication/data buses and/or data lines. In various embodiments, an output vector result received at output unit 409 is transmitted to a dot product engine. In some embodiments, the output vector result may be first written to memory, such as memory 161 of FIG. 1, or another memory location before being transmitted to a dot product engine. In some embodiments, additional components of channel convolution engine 400 are not shown.

In various embodiments, each vector unit of channel convolution processor unit 407, such as vector units 411 or 421, receives two vector operands and can perform one or more vector operations. For example, a vector unit can compute the dot product of the two input operands and output the result as one element of an output vector to output unit 409. In various embodiments, the output result of a vector unit corresponds to a channel convolution result data element of a corresponding channel convolution result matrix. In some embodiments, each vector unit of channel convolution processor unit 407, such as vector units 411 or 421, includes both a multiply unit and an adder unit. For example, vector unit 411 includes vector multiply unit 413 and vector adder unit 415 and vector unit 421 includes vector multiply unit 423 and vector adder unit 425.

In some embodiments, multiple instances of channel convolution engine 400 can operate in parallel to process different portions of an activation data input matrix. For example, each processing element and corresponding channel convolution engine can retrieve its assigned data elements of the activation data input matrix and corresponding weight matrices. In some embodiments, different processing elements share weight matrices and the data elements of the shared weight matrices can be broadcasted to the appropriate processing elements to improve memory efficiency. Each channel weight input unit of a processing element performs depthwise convolution operations on the assigned portions of the activation data input matrix using its own channel convolution processor unit. The results of each processing element can be transmitted to a dot product engine such as dot product engine 117 of FIG. 1.

Figure 5:
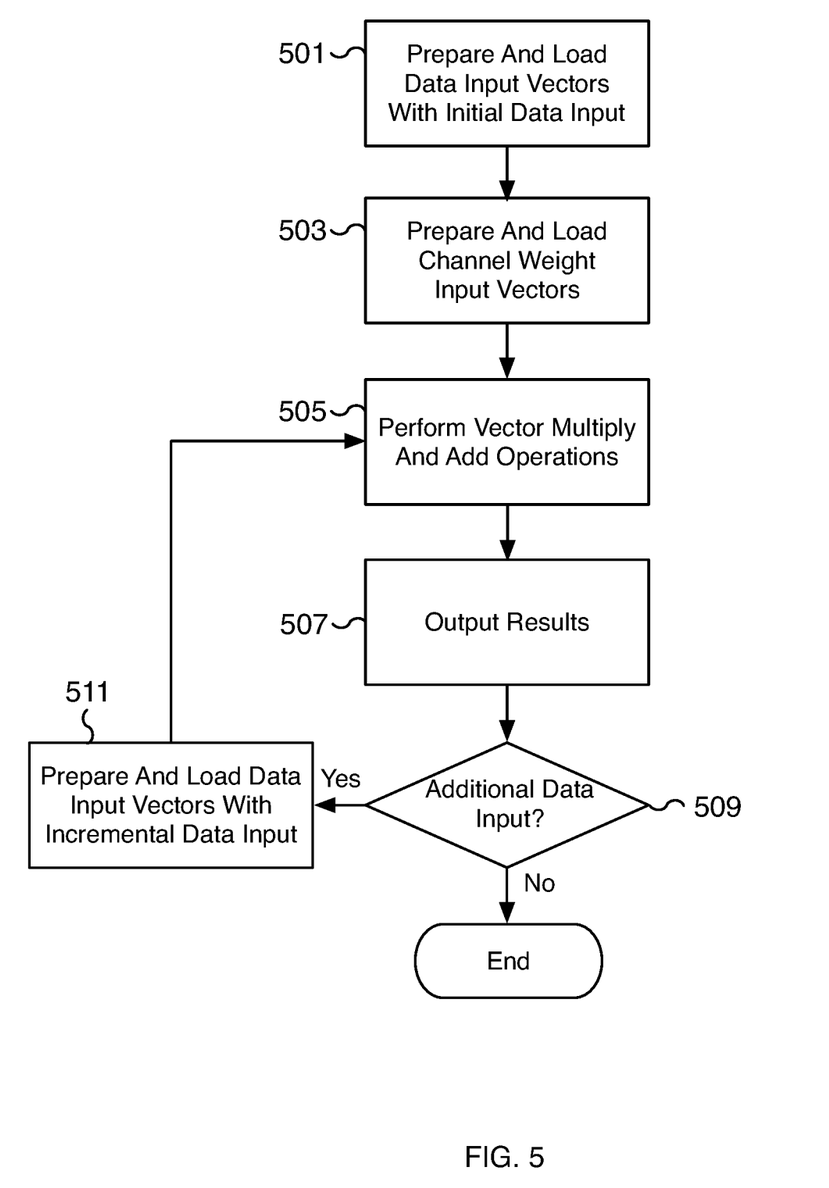
FIG. 5 is a flow chart illustrating an embodiment of a process for performing pipelined depthwise convolution using a channel convolution processor.

FIG. 5 is a flow chart illustrating an embodiment of a process for performing pipelined depthwise convolution using a channel convolution processor. The pipelined depthwise convolution operation may be initiated by issuing a convolution operation instruction and specifying the appropriate three-dimensional activation data input matrix and corresponding channel weight matrices. Parts of the convolution operation corresponding to different portions of the three-dimensional activation data input matrix and associated channel weight matrices can be assigned and performed by different processing elements. In some embodiments, the performance is significantly improved by distributing the workload across different processing elements. Each processing element receives a corresponding portion of the three-dimensional activation data input matrix and associated channel weight matrices. In some embodiments, the same channel weight matrices are used by multiple different processing elements and the channel weight matrices are broadcasted to the applicable processing elements to improve memory bandwidth efficiency. At each processing element, a channel convolution engine is utilized for performing depthwise convolution operations on the assigned portions of the activation data and channel weight convolution input arguments. For example, each processing element can process an instruction indicating a portion of an activation data input matrix and corresponding channel weight matrices to perform depthwise convolution operations. The instruction for a particular processing element can specify the location of the assigned portions of the activation data input matrix and the corresponding channel weight matrices in memory or another location.

In some embodiments, the convolution operations are performed using a processing element such as processing element 101 of FIG. 1 and in particular using a channel convolution processor unit of a channel convolution engine such as channel convolution engine 107 of FIG. 1 and/or channel convolution engine 400 of FIG. 4. In some embodiments, the channel convolution processor unit is part of channel convolution processor engine 107 of FIG. 1 and/or is channel convolution processor unit 407 of FIG. 4. In some embodiments, a data input unit and a channel weight input unit prepare the convolution input arguments for the channel convolution processor unit. In some embodiments, the data input unit is data input unit 403 of FIG. 4 and the channel weight input unit is channel weight input unit 405 of FIG. 4. In some embodiments, the results of each channel convolution processor unit are gathered at an output unit of the processing element such as output unit 409 of FIG. 4 and transmitted to a dot product engine. In various embodiments, as depthwise convolution results are determined, the output activations are transmitted in a pipeline manner to a dot product engine, such as a dot product engine 117 of FIG. 1 and/or a dot product engine 600 of FIG. 6, to process as pointwise convolution arguments. In some embodiments, the process of FIG. 5 is performed at steps 203 and/or 205 of FIG. 2 and/or at steps 301, 303, and/or 305 of FIG. 3.

At 501, data input vectors are prepared with an initial set of data input and loaded to vector units of a channel convolution processor unit. For example, data elements corresponding to a subset of a three-dimensional activation data input matrix are prepared as data input vectors for the initial set of data input. In various embodiments, the initial set of data input requires loading each data element. In some embodiments, each data input vector corresponds to a two-dimensional sub-matrix or matrix slice of the activation data input matrix and corresponds to a particular channel. The number of data input vectors corresponds to the number of vector units of the channel convolution processor unit and is the number of channels that can be processed in parallel. For example, in the event 32 channels are processed in parallel, 32 data input vectors are prepared and one is loaded into each vector unit of the channel convolution processor unit. In some embodiments, each matrix stored in a data input vector is a 3×3 matrix and matches the size of a corresponding channel weight matrix. In various embodiments, the size of the matrices may be another size, such as 5×5, 7×7, 9×9, 11×11 or another appropriate size. The size of each data input vector is based on the size of the matrix and is the number of elements of the matrix. For example, for a 3×3 matrix, each data input vector has 9 data elements and the vector unit can process 9 data elements to go along with 9 channel weight elements. As another example, for a 5×5 matrix, each data input vector has 25 data elements and the vector unit can process 25 data elements to go along with 25 channel weight elements.

In various embodiments, once prepared, each data input vector is loaded to an appropriate vector unit of the channel convolution processor unit. For example, each vector unit of the channel convolution unit is loaded with a prepared data input vector. The elements of the prepared data input vector correspond to a sub-matrix from a single channel of the activation data input matrix. In various embodiments, the corresponding data elements of each data input vector each have the same width and height location in the activation data input matrix but have different channel locations. In addition to the data input vector, each vector unit receives a corresponding channel weight input vector at 503.

At 503, channel weight input vectors are prepared and loaded to vector units of a channel convolution processor unit. For example, channel weight data elements corresponding to a set of channel weight matrices associated with a portion of a three-dimensional activation data input matrix are prepared as channel weight input vectors. In various embodiments, the channel weight elements associated with the initial set of activation data input requires loading each channel weight data element to the corresponding vector units. In some embodiments, processing of subsequent additional activation data can reuse the same channel weight input data without additional processing to prepare new channel weight input vectors. In some embodiments, each channel weight input vector corresponds to a different two-dimensional channel weight matrix associated with a different channel of the activation data input matrix. The number of channel weight input vectors corresponds to the number of vector units of the channel convolution processor unit and is the number of channels that can be processed in parallel. For example, in the event 32 channels are processed in parallel, 32 channel weight input vectors are prepared and one is loaded into each vector unit of the channel convolution processor unit. In some embodiments, each channel weight matrix stored in a channel weight input vector is a 3×3 channel weight matrix and matches the size of a corresponding activation data sub-matrix. In various embodiments, the size of the channel weight matrices may be another size, such as 5×5 channel weight matrices or another appropriate size. The size of each channel weight input vector is based on the size of the channel weight matrix and is the number of elements of the matrix. For example, for a 3×3 channel weight matrix, each channel weight input vector has 9 channel weight data elements and the vector unit can process 9 channel weight data elements to go along with 9 activation data elements. As another example, for a 5×5 channel weight matrix, each channel weight input vector has 25 channel weight data elements and the vector unit can process 25 channel weight data elements to go along with 25 activation data elements.

In various embodiments, once prepared, each channel weight input vector is loaded to an appropriate vector unit of the channel convolution processor unit based on the corresponding data input vector. For example, each vector unit of the channel convolution unit is loaded with a prepared channel weight input vector. The elements of the prepared channel weight input vector correspond to a channel weight matrix associated with a sub-matrix from a single channel of the activation data input matrix. In addition to the channel weight input vector, each vector unit receives a corresponding data input vector at 501.

At 505, vector multiply and vector add operations are performed. Utilizing the input vectors loaded from data input vectors at 501 or 511 and from channel weight input vectors at 503, each corresponding vector unit of a channel convolution processor unit performs vector multiply and add operations. Each element from a data input vector is multiplied by its corresponding element from a channel weight input vector. The result is a vector of multiplication results. For example, using 3×3 data and channel weight matrices, each one of nine data elements is multiplied against a corresponding one of nine channel weight elements to determine nine multiplication results. In some embodiments, the vector multiplication operation is performed by a vector multiply unit of a vector unit. Using the vector multiply result, a vector sum result is calculated by adding each of the elements from the vector of multiplication results. In various embodiments, the result is a channel convolution result data element of a channel convolution result matrix. In some embodiments, the sum is determined using a vector adder unit of the vector unit. For example, a vector adder unit using an adder tree can compute the sum of the vector elements. In some embodiments, each vector unit of a channel convolution processor unit performs a dot product operation using its corresponding loaded data input vector and channel weight input vector. The dot product result is a channel convolution result data element of a channel convolution result matrix.

In some embodiments, each vector unit performs its vector operations in parallel. For example, a channel convolution processor unit with 32 vector units can compute 32 convolution result data elements corresponding to 32 different channels. In some embodiments, each vector unit group independently determines the results associated with its assigned convolution operation in parallel with the other vector units of other vector unit groups.

At 507, results are outputted. For example, the vector result determined by performing the matrix multiply and add operations at 505 is outputted from the channel convolution processor unit. In various embodiments, the vector results are outputted as an output vector result, for example, to an output unit such as output unit 409 of FIG. 4. The output unit may be used to write the output vector result to memory. In some embodiments, the results are outputted and used as an argument to a subsequent matrix operation such as a point-wise convolution operation. In some embodiments, the results are outputted to a dot product engine such as dot product engine 117 of FIG. 1 and/or dot product engine 600 of FIG. 6.

At 509, a determination is made whether additional data input remains to be processed. For example, when traversing the assigned portion of an activation data input matrix horizontally along the width dimension, a determination is made whether additional columns of the assigned portion of an activation data input matrix exist. Similarly, when traversing vertically along the height dimension of the assigned portion of an activation data input matrix, a determination is made whether additional rows exist. In the event additional data input of the assigned portion of an activation data input matrix remains to be processed, processing proceeds to 511. In the event no additional data input remains to be processed, processing ends.

At 511, data input vectors using incremental data input are prepared and loaded to vector units of a channel convolution processor unit. For example, incremental data corresponding to the next column (or row) of data of the assigned portion of an activation data input matrix is loaded. When traversing horizontally along the width dimension, an additional column of the assigned portion of an activation data input matrix is loaded. Similarly, when traversing vertically along the height dimension, an additional row of the assigned portion of an activation data input matrix is loaded. This incremental data is used along with data loaded from the previous iteration of 501 or 511 to prepare input data vectors. For example, when traversing horizontally, data from the second and third columns of the previous iteration are shifted to the first and second columns and combined with the newly loaded third column to create new data input vectors. The new data input vectors correspond to shifting the sub-matrix slice of an activation data input matrix horizontally. In some embodiments, the new data input vectors correspond to sliding the relevant convolution matrix of the activation data along the width dimension. Similarly, when traversing vertically, data from the second and third rows of the previous iteration are shifted to the first and second rows and combined with the newly loaded third row to create new data input vectors. The new data input vectors correspond to shifting the sub-matrix slice of an activation data input matrix vertically. In some embodiments, the new data input vectors correspond to sliding the relevant convolution matrix of the activation data along the height dimension. In various embodiments, only the initial set of data input requires loading an entire matrix of data elements and is performed at 501. At 511, only incremental data elements are needed.

In various embodiments, the new data input vectors corresponding to a new sub-matrix of the assigned activation data input matrix are loaded to the corresponding vector units. The existing channel weight input vectors can be reused since the relative channel dimensions have not changed. By only loading the new incremental activation data and reusing the channel weight data elements, significant performance improvements are achieved when performing the convolution operation.

Figure 6:
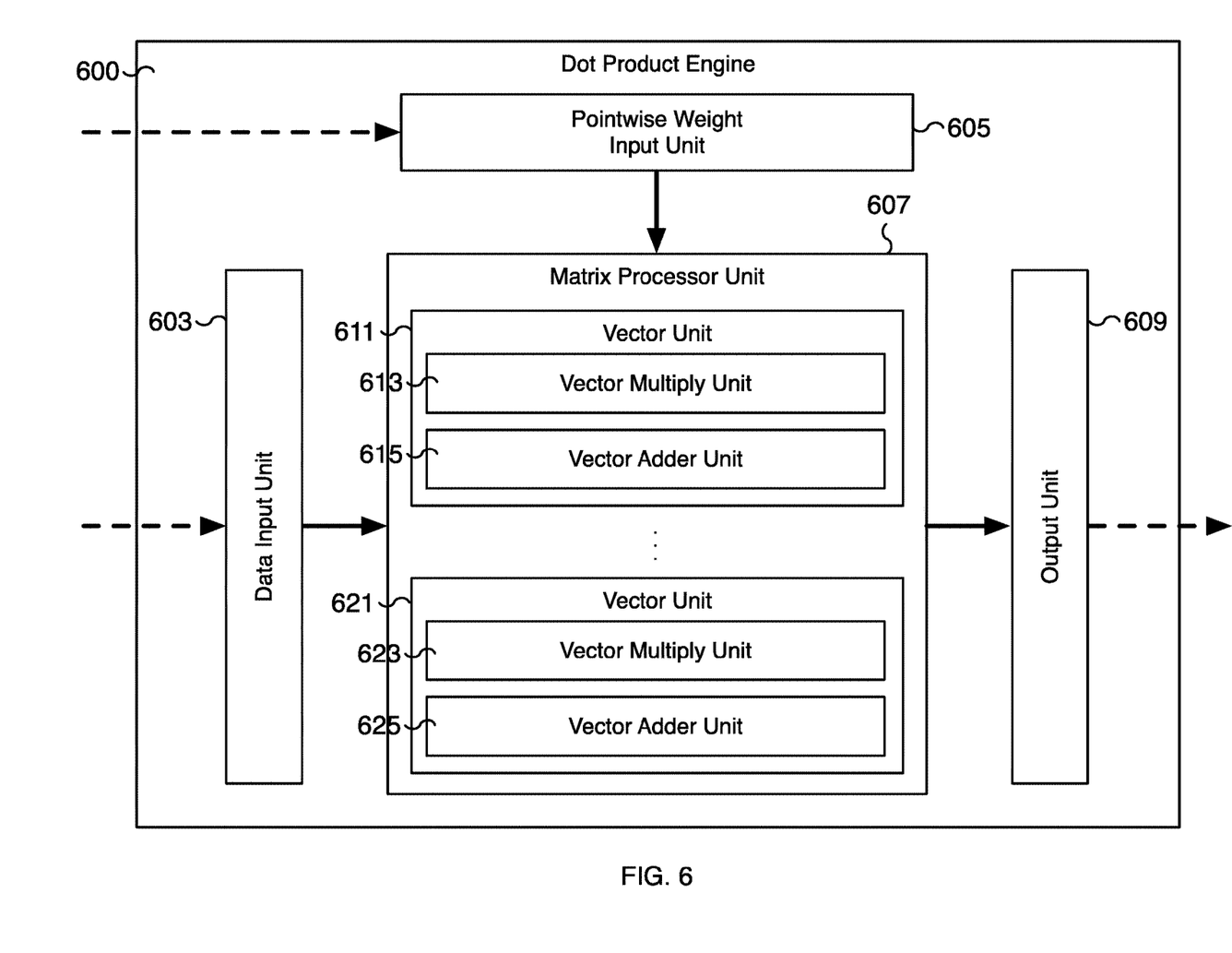
FIG. 6 is a block diagram illustrating an embodiment of a dot product engine for solving artificial intelligence problems using a neural network.

FIG. 6 is a block diagram illustrating an embodiment of a dot product engine for solving artificial intelligence problems using a neural network. In the example shown, dot product engine 600 includes data input unit 603, pointwise weight input unit 605, matrix processor unit 607, and output unit 609. In some embodiments, dot product engine 600 is a hardware integrated circuit, for example, an application specific integrated circuit (ASIC) and includes hardware components data input unit 603, pointwise weight input unit 605, matrix processor unit 607, and output unit 609. As compared to a general purpose processor, dot product engine 600 is designed and implemented using a specialized hardware integrated circuit to more efficiently perform one or more specific computing tasks related to performing convolution operations and/or solving artificial intelligence problems using a neural network. The specialized hardware results in significant performance improvements and resource efficiencies gained over using a general purpose processor. In some embodiments, dot product engine 600 is dot product engine 117 of FIG. 1.

In the example shown, matrix processor unit 607 includes multiple vector calculation units including at least vector units 611 and 621 used to compute dot product results. Each vector unit includes at least a vector multiply unit and a vector adder unit. For example, vector unit 611 includes vector multiply unit 613 and vector adder unit 615 and vector unit 621 includes vector multiply unit 623 and vector adder unit 625. In various embodiments, matrix processor unit 607 includes at least the number of vector units to match the number of elements in an input data vector generated by data input unit 603. In some embodiments, matrix processor unit 607 is configured to perform matrix multiplication on two input matrices. In some embodiments, matrix processor unit 607 is configured to perform pipelined pointwise convolution operations and each vector unit of matrix processor unit 607 is configured to determine a dot product result from two input vectors, one provided by data input unit 603 and the other from pointwise weight input unit 605. The results are outputted to output unit 609, which can be used to write dot product results to memory, such as memory 161 of FIG. 1. For example, in some embodiments, each vector unit, such as vector units 611 and 621, receives two pairs of input vectors (not shown) corresponding to a data vector of depthwise convolution results and a vector of pointwise convolution weights. The dot product result of the two input vectors is calculated and transmitted to output unit 609. In some embodiments, matrix processor unit 607 includes 32 vector units and 32 dot product results are determined and outputted to output unit 609. In various embodiments, matrix processor unit 607 may include another appropriate number of vector units. In the example shown, only two of the vector units of matrix processor unit 607 are illustrated. In various embodiments, the arrows of FIG. 6 represent the direction data moves through the components of dot product engine 600. For example, the arrows may correspond to multi-element wide communication/data buses and/or data lines. In some embodiments, additional components of dot product engine 600 are not shown.

In some embodiments, matrix processor unit 607 is configured to perform pointwise convolution using its vector units. For example, data input unit 603 may receive a vector of depthwise convolution results, such as a 32-element vector of depthwise convolution results. Data input unit 603 can broadcast the vector of depthwise convolution results (or output activations) to each of the vector units of matrix processor unit 607, such as vector units 611 and 621. Pointwise weight input unit 605 can prepare a vector of pointwise convolution weights for each vector unit of matrix processor unit 607. In some embodiments, each vector of pointwise convolution weights includes 32-elements, matching the 32-element vector of depthwise convolution results received at each vector unit from and prepared by data input unit 603. Each vector unit of matrix processor unit 607 concurrently calculates pointwise convolution results that are outputted to output unit 609. As new depthwise convolution results are received, they are prepared by data input unit 603 for the vector units of matrix processor unit 607. In some embodiments, the pointwise weights prepared by pointwise weight input unit 605 can be reused across different depthwise convolution inputs. For example, the pointwise weights need only be loaded to the vector units of matrix processor unit 607 a single time and can be reused as different depthwise convolution results are successively processed by matrix processor unit 607 using pointwise convolution operations. In some embodiments, the depthwise convolution results are output activations calculated using a channel convolution engine. Although 32-element vector inputs are used in the above example, a different size vector input can be used as appropriate.

In some embodiments, data input unit 603 is used to load an input data vector into each vector unit of matrix processor unit 607. Each vector unit receives a corresponding different pointwise convolution weights input vector prepared by pointwise weight input unit 605. In some embodiments, the same input data vector operand is broadcasted to multiple vector units of matrix processor unit 607. This allows the same data input vector to be processed by different input vectors of different pointwise convolution weights. By broadcasting the same data input vector operand, multiple vector units compute a dot product of the same data input vector (or depthwise convolution results) with different pointwise convolution weights in parallel. Once the dot product result of a vector unit is determined, a new data input vector corresponding to newly determined depthwise convolution results can be broadcasted to the appropriate vector units to determine the next pointwise convolution results. By reusing the pointwise convolution weights, the dot product results can be determined using the same weights. As additional pointwise convolution weights are needed, pointwise weight input unit 605 can prepare and load new pointwise convolution weights as input vectors to the vector units of matrix processor unit 607.

In some embodiments, matrix processor unit 607 includes multiple vector units that each include a vector multiply and a vector adder unit. Each vector multiply unit, such as vector multiply unit 613 or 623, is configured to multiply corresponding elements received via data input unit 603 and pointwise weight input unit 605. In some embodiments, the result is a vector of multiplication results. For example, for two 32-byte input vectors, the result of a vector multiply unit is a vector of 32 multiplication results. The first element of a depthwise convolution result vector prepared by data input unit 603 is multiplied with the first element of a pointwise convolution weights input vector prepared by pointwise weight input unit 605. Similarly, the second element of the depthwise convolution result vector is multiplied with the second element of the pointwise convolution weights input vector. In various embodiments, the vector of multiplication results is passed to a vector adder unit of the vector unit. For example, vector multiply unit 613 passes its multiplication results to vector adder unit 615 and vector multiply unit 623 passes its multiplication results to vector adder unit 625.

In some embodiments, each vector adder unit, such as vector adder unit 615 or 625, is configured to compute the sum of the elements from an input vector. For example, the sum of each of the elements from a vector of multiplication results computed by vector multiply unit 613 is computed by vector adder unit 615. Similarly, the sum of each of the elements from a vector of multiplication results computed by vector multiply unit 623 is computed by vector adder unit 625. In some embodiments, the result of a vector adder unit is a dot product of the vectors used as input to the corresponding vector multiply unit. In various embodiments, each vector adder unit, such as vector adder unit 615 or 625, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple dot products in parallel, significantly improving the throughput of matrix manipulation operations.

In some embodiments, multiple instances of dot product engine 600 can operate in parallel to process the output of different channel convolution engines. For example, each processing element and corresponding dot product engine can receive depthwise convolution results from an appropriate channel convolution engine and also receive corresponding pointwise weights associated with the received depthwise convolution results. In some embodiments, different processing elements and dot product engines share the same pointwise weights and the shared pointwise weights can be broadcasted to the appropriate processing elements and corresponding dot product engines to improve memory efficiency. Each dot product engine 600 of a processing element performs pointwise convolution operations on the appropriate output activations using its own matrix processor unit. The results of each processing element can be transmitted to memory, such as memory 161, another storage location, or another component such as a downstream processing component.

Figure 7:
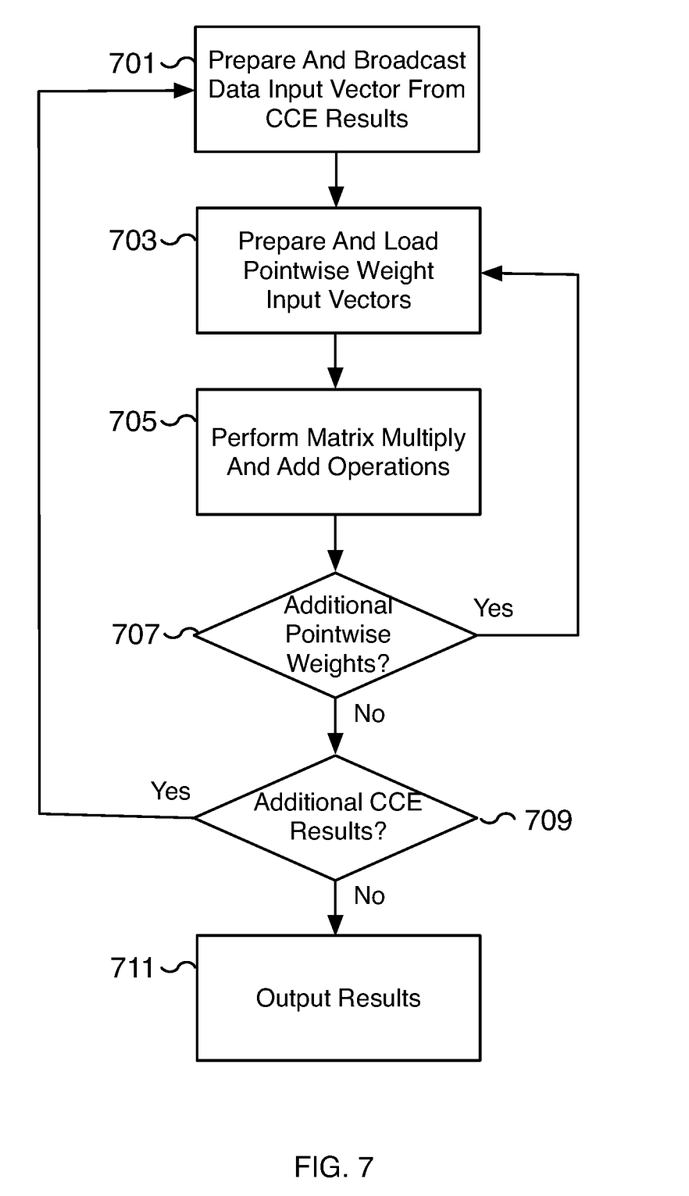
FIG. 7 is a flow chart illustrating an embodiment of a process for performing pipelined pointwise convolution using a dot product engine.

FIG. 7 is a flow chart illustrating an embodiment of a process for performing pipelined pointwise convolution using a dot product engine. Using the process of FIG. 7, pointwise convolution operations can be performed by a dot product engine while pipelined with depthwise convolutions performed by a channel convolution engine. For example, a dot product engine includes a matrix processor unit that processes depthwise convolution results determined using a channel convolution engine. The depthwise convolution results are prepared and broadcasted to vector units of the matrix processor unit. The same vector units each receive a corresponding input vector of pointwise convolution weights. The vector units of the matrix processor unit perform dot product operations to determine pointwise convolution results. As new depthwise results are calculated, the matrix processor unit receives the results and determines additional pointwise convolution results. The determined pointwise convolution results correspond to a portion of separable convolution results of a 3D convolution operation. To further increase the throughput and efficiency of the pointwise convolution computations, the pointwise convolution weights can be reused across new depthwise convolution results. In the event additional pointwise convolution weights are needed, the additional weights can be loaded into the vector units of the matrix processor unit along with corresponding depthwise convolution results to determine corresponding separable convolution results. In some embodiments, the depthwise convolution portion is determined using the process of FIG. 5. In some embodiments, the process of FIG. 7 is performed at steps 203, 207, and/or 209 of FIG. 2 and/or at steps 307, 309, and/or 311 of FIG. 3. In some embodiments, the process of FIG. 7 is performed using dot product engine 117 of FIG. 1 and/or dot product engine 600 of FIG. 6.

At 701, results received from a channel convolution engine are prepared as a data input vector and broadcasted to vector units of a matrix processor unit. In some embodiments, the data input vectors are prepared by a data input unit of a dot product engine, such as data input unit 603 of FIG. 6. In some embodiments, the size of the data input vector corresponds to a cache line or multiple of a cache line and/or is determined by a channel convolution engine. Once prepared into an input vector, the data input vector is broadcasted to multiple vector units. For example, each vector unit of a matrix processor unit can receive the same data input vector. This allows the same depthwise convolution results to be processed with different pointwise convolution weights concurrently.

At 703, pointwise convolution weight input vectors are prepared and loaded to corresponding vector units of the matrix processor unit. In some embodiments, a different set of pointwise convolution weights is loaded to each vector unit. A pointwise convolution weight input vector includes as many elements as the corresponding data input vector. In some embodiments, pointwise convolution weight input vectors are prepared by a pointwise weight input unit of a dot product engine, such as pointwise weight input unit 605 of FIG. 6. The number of pointwise convolution weight input vectors prepared can match the number of vector units of the matrix processor unit. For example, for a matrix processor unit with 32 vector units, up to 32 different pointwise convolution weight input vectors are prepared and one is loaded to each of the corresponding 32 vector units.

In some embodiments, across different data input vectors, the same pointwise convolution weight input vectors can be reused and do not need to be reloaded to the vector units. This reuse improves the efficiency and throughput of performing pointwise convolution operations. In the event additional pointwise weights remain and are required for processing, one or more new pointwise convolution weight input vectors can be prepared and loaded to corresponding vector units. In some embodiments, the new pointwise convolution weight input vectors are loaded without requiring the existing data input vector to be reloaded.

At 705, matrix multiply and add operations are performed. In some embodiments, the matrix multiply and add operations performed are dot product operations. Utilizing the input vectors loaded from the broadcasted data input vector at 701 and from a corresponding pointwise weight input vector at 703, the corresponding vector units of a matrix processor unit each perform vector unit operations including vector multiply and add operations to determine dot product results. Each vector unit may perform a vector matrix multiply operation using the data input vector and its corresponding pointwise weight input vector and a subsequent vector add operation to determine a corresponding dot product and/or pointwise convolution result. In various embodiments, the multiplication results are added using a vector adder to compute a resulting sum. For example, a 32-element vector unit receives two 32-element input vectors (a data input vector and a corresponding pointwise weight input vector) and performs a vector multiply to compute 32 multiplication results. A vector add operation is performed to add all 32 multiplication results to compute a single result sum. In some embodiments, each resulting sum is a dot product result and/or a pointwise convolution result. In some embodiments, the result is a separable convolution result corresponding to a 3D convolution operation.

In some embodiments, each vector unit performs its vector operations in parallel. For example, a matrix processor unit with 32 vector units can compute 32 results corresponding to 32 pointwise convolution results. In various embodiments, each vector unit of a matrix processor unit performs a dot product operation using the broadcasted data input vector and its corresponding pointwise weight input vector. The results of the vector units can be prepared as an output vector of results. For example, 32 vector units are used to determine a 32-element output vector of results.

In some embodiments, the matrix multiply and add operations are performed by a matrix processor unit such as matrix processor unit 607 of FIG. 6. The vector multiply operations can be performed by vector multiply units such as vector multiply units 613 and/or 623 of FIG. 6. The vector add operations can be performed by vector adder units such as vector adder units 615 and/or 625 of FIG. 6.

At 707, a determination is made whether additional pointwise convolution weights remain to be processed. In the event additional pointwise convolution weights remain to be processed, processing proceeds to 703. In the event no additional pointwise convolution weights remain to be processed, processing proceeds to 709.

At 709, a determination is made whether additional channel convolution engine results remain to be processed. In the event additional channel convolution engine results remain to be processed, processing proceeds back to 701. For example, the channel convolution engine has determined additional depthwise convolution results that will be used for performing pointwise convolution. The new results are prepared at 701 into data input vectors and broadcasted to the vector units of the matrix processor unit. In the event no additional channel convolution engine results remain to be processed, processing proceeds to 711.

At 711, results are outputted. In some embodiments, the results of the matrix processor unit are received at and outputted by an output unit such as output unit 609 of FIG. 6 of a dot product engine. For example, pointwise convolution results determined by performing vector unit operations at 705 are outputted from the dot product engine. In some embodiments, the results are a vector of results and are outputted as a vector. For example, the output vector can be a cache line or multiple of a cache line for improved memory writes. The results may be outputted to a memory such as memory 161 of FIG. 1 and/or another storage location. In some embodiments, the results are output to another processing component.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
   a hardware channel convolution processor unit configured to perform a portion of a depthwise convolution, including by being configured to:
   multiply each data element of a first group of data elements of a plurality of channels of a portion of a convolution data matrix with a corresponding data element of a second group of data elements of a plurality of depthwise convolution weight matrices to determine a corresponding multiplication result of multiplication results; and
   for each specific channel of the plurality of channels, sum together ones of the multiplication results corresponding to the specific channel to determine one corresponding channel convolution result data element in a corresponding channel convolution result matrix to calculate a portion of depthwise convolution results; and
   a hardware dot product processor unit configured to perform at least a portion of a pointwise convolution, including by being configured to apply pointwise weight matrices to the portion of depthwise convolution results calculated using the hardware channel convolution processor unit to determine a portion of separable convolution results while at least another portion of the depthwise convolution results is being calculated in parallel by the hardware channel convolution processor unit of the processor system;
   wherein the hardware channel convolution processor unit and the hardware dot product processor unit are different hardware units and the portion of depthwise convolution results is provided from the hardware channel convolution processor unit to the hardware dot product processor unit for pipeline processing.

2. The system of claim 1, further comprising a first processing element and a second processing element, and wherein the first processing element includes the hardware channel convolution processor unit and the second processing element includes the hardware dot product processor unit.

3. The system of claim 1, wherein a total count of the data elements of the first group is the same as a total count of the data elements of the second group.

4. The system of claim 1, wherein the hardware channel convolution processor unit comprises a plurality of calculation units and each calculation unit of the plurality of calculation units is configured to receive a plurality of data elements of the first group corresponding to a same channel of the convolution data matrix and a plurality of corresponding data elements of the second group corresponding to a separate convolution weight matrix for the same channel of the convolution data matrix.

5. The system of claim 4, wherein each calculation unit of the plurality of calculation units includes a different vector multiply unit and a different vector adder unit.

6. The system of claim 5, wherein each of the different vector adder units includes a different adder tree.

7. The system of claim 1, wherein the convolution data matrix is a three-dimensional machine learning data matrix.

8. The system of claim 1, further comprising a data input unit configured to: process the data elements of the first group by channel into a plurality of data input vectors, wherein each of the plurality of data input vectors includes data elements corresponding to a two-dimensional sub-matrix of the convolution data matrix.

9. The system of claim 1, further comprising a weight input unit configured to: process the data elements of the second group into a plurality of weight input vectors, wherein each of the plurality of weight input vectors includes data elements corresponding to one of the plurality of depthwise convolution weight matrices.

10. The system of claim 1, wherein each of the plurality of depthwise convolution weight matrices is a 3×3, 5×5, 7×7, 9×9, or 11×11 matrix.

11. The system of claim 1, wherein the data elements of the first group are 4-bit, 8-bit, 2-byte, or 4-byte elements.

12. The system of claim 1, wherein a total count of the data elements of the first group is a multiple of a cache line size.

13. The system of claim 1, wherein a total count of the pointwise weight matrices is a multiple of a cache line size.

14. The system of claim 1, wherein the portion of depthwise convolution results calculated using the hardware channel convolution processor unit is stored in a local memory of a processing element.

15. The system of claim 1, wherein the portion of depthwise convolution results calculated using the hardware channel convolution processor unit to determine the portion of separable convolution results has a width and height dimension of 1×1.

16. The system of claim 15, wherein a depth dimension of the portion of depthwise convolution results calculated using the hardware channel convolution processor unit to determine the portion of separable convolution results is a multiple of a cache line size of a memory.

17. The system of claim 1, wherein the convolution data matrix, the plurality of depthwise convolution weight matrices, the portion of depthwise convolution results, the pointwise weight matrices, and the portion of separable convolution results are arranged in a depth-first layout format.

18. A method, comprising:
receiving a three-dimensional convolution operation instruction specifying a convolution data matrix;
identifying separate convolution operations from the received three-dimensional convolution operation instruction;
using a hardware channel convolution processor unit to:
perform a depthwise convolution operation with a portion of the convolution data matrix and a plurality of depthwise convolution weight matrices; and
determine a portion of depthwise convolution results; and
using a hardware dot product processor unit to:
perform a pipelined pointwise convolution operation using the portion of depthwise convolution results and a plurality of pointwise weight matrices while at least another portion of the depthwise convolution results is being calculated in parallel by the hardware channel convolution processor unit; and
determine separable convolution results;
wherein the hardware channel convolution processor unit and the hardware dot product processor unit are different hardware units and the portion of depthwise convolution results is provided from the hardware channel convolution processor unit to the hardware dot product processor unit for pipeline processing.

19. The method of claim 18, further comprising storing the separable convolution results to a memory location using a same layout format as the convolution data matrix.

20. A method, comprising:
for each data element of a first group of data elements of a plurality of channels of a portion of a convolution data matrix, multiplying at a hardware channel convolution processor unit the data element of the first group of data elements with a corresponding data element of a second group of data elements of a plurality of depthwise convolution weight matrices to determine a corresponding multiplication result of multiplication results;
for each specific channel of the plurality of channels, summing together at the hardware channel convolution processor unit ones of the multiplication results corresponding to the specific channel to determine one corresponding channel convolution result data element in a corresponding channel convolution result matrix to calculate a portion of depthwise convolution results;
transmitting the portion of depthwise convolution results from the hardware channel convolution processor unit to a hardware dot product processor unit for pipeline processing; and
applying at the hardware dot product processor unit pointwise weight matrices to the portion of depthwise convolution results calculated using the hardware channel convolution processor unit to determine a portion of separable convolution results while at least another portion of the depthwise convolution results is being calculated in parallel by the hardware channel convolution processor unit;
wherein the hardware channel convolution processor unit and the hardware dot product processor unit are different hardware units U.

* * * * *